March 4, 1958 G. F. ZIFFER 2,825,805

HIGH SPEED COUNTER CIRCUIT

Filed Feb. 13, 1953 3 Sheets-Sheet 1

| INPUT PULSES | STAGE I | STAGE II | STAGE III | STAGE IV |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0/1 | 1 | 0 |
| 5 | 1 | 1 | 1 | 0 |
| 6 | 0 | 0 | 0/1 | 1 |
| 7 | 1 | 0 | 1 | 1 |
| 8 | 0 | 1 | 1 | 1 |
| 9 | 1 | 1 | 1 | 1 |
| 10 | 0 | 0 | 0 | 0 |

FIG. 1

PRIOR ART

| INPUT PULSES | STAGE I | STAGE II | STAGE III | STAGE IV |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 0 | 0 | 0 |

FIG. 2

| INPUT PULSES | STAGE I | STAGE II | STAGE III | STAGE IV | STAGE T |
|---|---|---|---|---|---|
| 0 | 0 | 0 | 0 | 0 | 0 |
| 1 | 1 | 0 | 0 | 0 | 0 |
| 2 | 0 | 1 | 0 | 0 | 0 |
| 3 | 1 | 1 | 0 | 0 | 0 |
| 4 | 0 | 0 | 1 | 0 | 0 |
| 5 | 1 | 0 | 1 | 0 | 0 |
| 6 | 0 | 1 | 1 | 0 | 0 |
| 7 | 1 | 1 | 1 | 0 | 0 |
| 8 | 0 | 0 | 0 | 1 | 1 |
| 9 | 1 | 1 | 1 | 1 | 0 |
| 10 | 0 | 0 | 0 | 0 | 0 |

FIG. 4

| INPUT PULSES | STAGE I | STAGE II | STAGE III | STAGE IV | STAGE T |
|---|---|---|---|---|---|
| 0 | 0 | 0 | 0 | 0 | 1 |
| 1 | 1 | 1 | 1 | 0 | 0 |
| 2 | 0 | 0 | 0 | 1 | 0 |
| 3 | 1 | 0 | 0 | 1 | 0 |
| 4 | 0 | 1 | 0 | 1 | 0 |
| 5 | 1 | 1 | 0 | 1 | 0 |
| 6 | 0 | 0 | 1 | 1 | 0 |
| 7 | 1 | 0 | 1 | 1 | 0 |
| 8 | 0 | 1 | 1 | 1 | 0 |
| 9 | 1 | 1 | 1 | 1 | 0 |
| 10 | 0 | 0 | 0 | 0 | 1 |

FIG. 5

INVENTOR
GARRET F. ZIFFER
BY
ATTORNEY

March 4, 1958 G. F. ZIFFER 2,825,805

HIGH SPEED COUNTER CIRCUIT

Filed Feb. 13, 1953 3 Sheets-Sheet 2

INVENTOR GARRET F. ZIFFER

BY Spencer E. Olson

ATTORNEY

March 4, 1958 G. F. ZIFFER 2,825,805

HIGH SPEED COUNTER CIRCUIT

Filed Feb. 13, 1953 3 Sheets-Sheet 3

INVENTOR
GARRET F. ZIFFER
BY
Spencer E. Olson
ATTORNEY 2,825,805

HIGH SPEED COUNTER CIRCUIT

Garret F. Ziffer, Cambridge, Mass., assignor to Tracerlab, Inc., Boston, Mass., a corporation of Massachusetts Application February 13, 1953, Serial No. 336,763

11 Claims. (Cl. 250—27)

This invention relates to an electronic counting circuit, and more particularly to a high speed decade counter comprising a series chain of binary trigger circuits.

In electronic counters of the series chain type, a plurality of trigger circuits, each having two different stable conditions, are so connected that each of the trigger circuits is changed or switched from either condition to the other condition upon application to the trigger circuit of a voltage pulse of predetermined character. In binary counting circuits of this type, the trigger circuits are connected in a series chain so that upon two changes of the condition of any trigger circuit, a single output voltage pulse is supplied therefrom to the next succeeding trigger circuit in the chain to switch that next trigger circuit, whereby application of the pulses to be counted to the first trigger circuit only results in an output count which is a fraction of the input count in the binary system of numerical notation.

Since the binary system is difficult to interpret and is not satisfactory for many operations, binary counters of the type described, have heretofore been modified to produce counters for use with the decimal system of notation. In the past, scale-of-ten, or decade counters, have been provided by modifying a scale-of-sixteen counter, consisting of four bistable trigger circuits connected in a series chain, but each of the modifications of the prior art of which applicant is aware, have the disadvantage of reducing the speed of operation of the counter to some extent, thus limiting the frequency of the input pulses that could be counted.

One arrangement which has been commonly used is known as the "sixteen-minus-six" circuit, and depends for its count of ten on feeding back from a later stage in the chain to an earlier one six pulses or their equivalent. To facilitate explanation of this modification, as well as the operation of the present invention, it will be helpful to adopt a certain amount of symbolism. Let "0" describe the original or "even" state of a bistable trigger circuit, and let "1" describe the "odd" state of a bistable circuit. To describe the transition from one state to another, let the two states be subscripts of the trigger circuit number, preceding the final state by the original one. Thus, the designation "$4_{10}$" means that stage 4 is switched from its "odd" to its "even" state. If a stage has no subscript, it means that it can be switched either way. Let an arrow (→) indicate triggering and let a cross (×) describe blocking, and if an arrow and a cross occur simultaneously, let the cross take precedence. Returning now to the "sixteen-minus-six" circuit, the desired result can be obtained in the two following ways:

(*a*) $1_{10}\rightarrow 2,\ 2_{10}\rightarrow 3,\ 3_{10}\rightarrow 4,\ 3_{01}\rightarrow 2_{01},\ 4_{01}\rightarrow 3_{01}$ (*b*) $1_{10}\rightarrow 2,\ 2_{10}\rightarrow 3,\ 3_{10}\rightarrow 4,\ 4_{01}\rightarrow 2_{01},\ 4_{01}\rightarrow 3_{01}$ To clarify the symbolism, method (*a*) states that as trigger circuit one goes from its "odd" to "even" state it triggers stage two; stage two in going from "odd" to "even," triggers stage three; stage three in going from "odd" to "even," triggers stage 4; also, a feedback arrangement is provided between stages three and two such that as stage three goes from "even" to "odd," stage two is triggered from "even" to "odd"; and a feedback connection between stage four and stage three provides a transition of stage three from the "even" to the "odd" state as stage four goes from the "even" to the "odd" state. The table of Fig. 1 of the drawings shows the detailed operation of method (*a*) and the way in which a count of ten is actually produced. The method is straightforward, and relatively simple, but when high speed counting is necessary, its shortcomings are readily apparent. While a particular trigger circuit, upon reception of a switching trigger, can transmit information practically instantaneously, the completion of the switching cycle and the assumption of a state where the circuit can again be switched, takes a very finite time. As can be seen from the table of Fig. 1, using method (*a*) described above, on count four, stage two is switched to its "even" state and then, at the same point in the cycle, is switched right back to the "odd" state. This double switching places a definite upper limit on the speed at which the counter can be operated, and furthermore, the simultaneous presence of forward pulses and feedback pulses places rather stringent requirements on their relative amplitude and phasing, which makes a fast scale with its small plate and grid excursions too critical for reliable operation.

Another circuit arrangement of the prior art, known as the eight-plus-two counter, counts to eight by means of three binary stages and then adds two more pulses or counts from a fourth stage. Using the symbolism described above, this result is obtained in the following manner, $1_{10}\rightarrow 2,\ 2_{10}\rightarrow 3,\ 3_{10}\rightarrow 4,\ 1_{10}\rightarrow 4_{10},\ 4_{1}\times 2_{0}$. The detailed operation of this sequence is shown in the table of Fig. 2. The blocking required for this scheme is usually achieved by means of diodes in the blocking and blocked stages. In a high speed scale, which cannot be readily triggered in the plate circuit, this is not feasible. Furthermore, stage four, after blocking stage two on the count of ten, must itself switch its state on the same count. This tends to produce phasing problems which limit the speed and reliability of the counter.

Accordingly, it is the principal object of the present invention to provide a counter from a series of inherently binary trigger stages wherein the above shortcomings of the prior art are avoided.

Another object is to provide an improved high speed decade counter from a series of inherently binary trigger stages in which the feedback pulses are inserted into the scale at a different time in the cycle than the forward procession of information.

Another object of the invention is to provide a high speed decade scaler comprising a series of binary stages, and an auxiliary trigger circuit cooperating with the binary scaler to generate and feed back pulses to the binary stages at different times in the cycle than the forward procession of information.

Another object of the invention is to provide a counter circuit which is insensitive to the phase and amplitude of trigger and feedback pulses in the counter.

A further object is to provide a high speed decade counting circuit wherein there is no interaction between forwardly moving trigger pulses and feedback pulses.

Other objects and advantages of the invention will become apparent from the following detailed description of a preferred embodiment of the invention when taken with the accompanying drawings in which:

Figs. 1 and 2 are tables showing the operation of two prior art methods of providing a decade counter from a series of inherently binary trigger circuits, a description of which has been given above, and to which further reference will not be made;

Fig. 4 is a table showing the condition of the various trigger stages for one complete cycle of counter operation of the circuit of the present invention;

Fig. 5 is a table showing the condition of various trigger stages for one complete cycle of counter operation of a modification of the circuit of Fig. 3.

Figure 3:
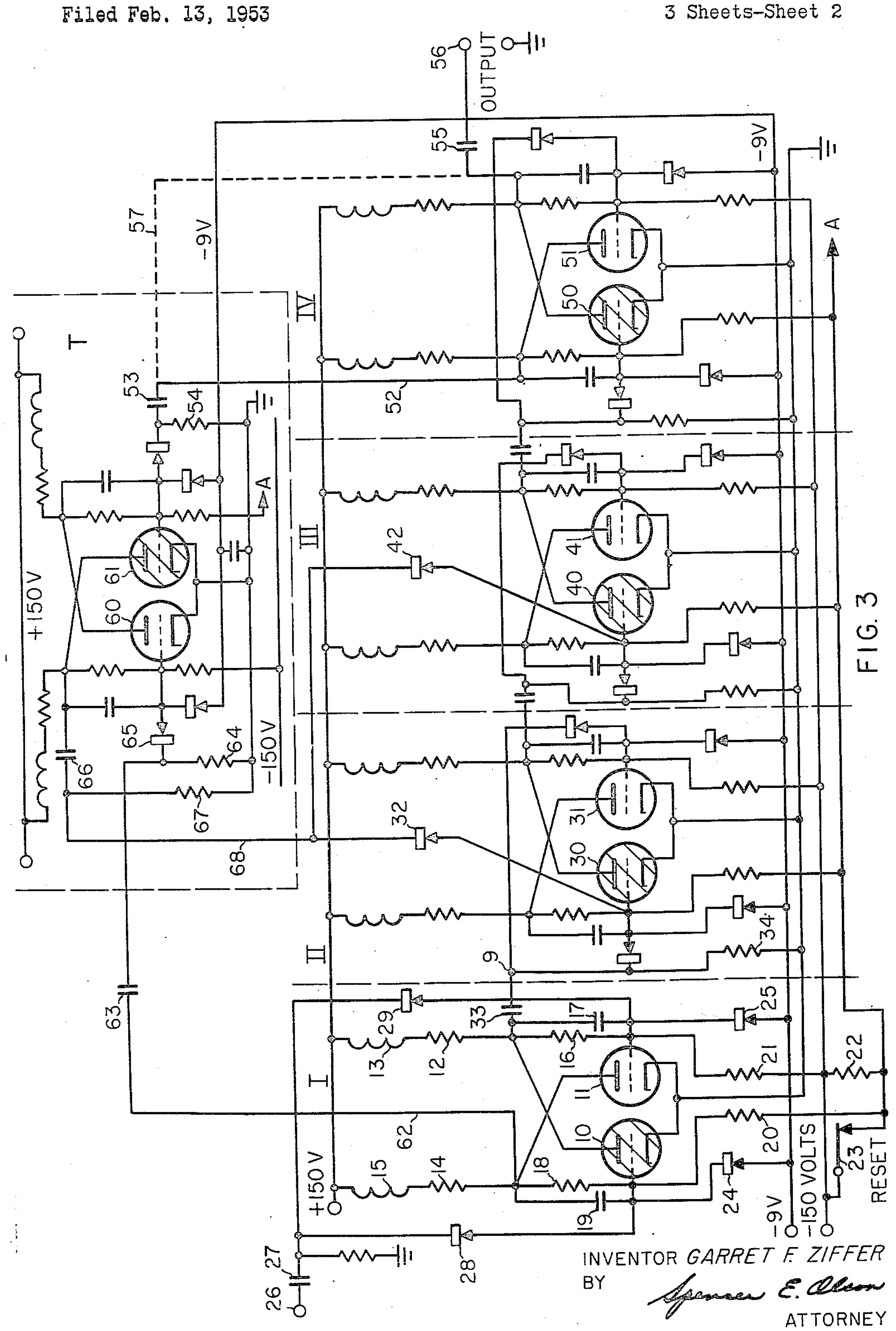
Fig. 3 is a circuit diagram illustrating a preferred embodiment of the invention.

Referring to the drawings, and more particularly to Fig. 3, the circuit of the counter comprises generally four trigger stages I, II, III, and IV, and an auxiliary trigger circuit T, each separated from each other, in the drawing, by broken lines. Each of the tubes used is a type 5844, a twin-triode tube especially designed for computer application, but it is to be understood that any suitable type tube may be used without departing from the principles set forth herein.

Each trigger stage I, II, III, and IV and the auxiliary trigger T has two stable conditions, alternately assumed, and designated herein as the "even" and "odd" conditions. The trigger stages of the present circuit are in the "even" or "0" condition when the shaded tube of the drawing is conductive and the unshaded tube is simultaneously nonconducting, and is in the odd or "1" condition when the shaded tube is nonconductive and the unshaded tube is simultaneously conductive. For example, in Fig. 3, trigger I is in the "even," or "0" stage when tube 10 is conductive and tube 11 is non-conducting, and is in the "odd" or "1" state when tube 11 is conductive and tube 10 is nonconducting. At the zero, or pre-selected starting condition, triggers I, II, III, IV, and auxiliary trigger T are all in their "even" or "0" states as indicated by the shading of the conductive tubes.

The circuit arrangement and operation of trigger stage I will be described with reference to the applied voltages and circuit values, the operation of triggers II, III, IV, and T being similar to that of stage I, except as noted hereinafter.

The cathodes of tubes 10 and 11 are directly connected to ground and the plates are connected to a +150 volt line, the plate of tube 10 being connected through resistor 12 and inductor 13 in series and the plate of tube 11 being connected through resistor 14 and inductor 15 in series. Resistors 12 and 14 each have a value of 10,000 ohms and inductors 13 and 15 each have a value of one millihenry. Inductors 13 and 15 are included in the circuit to compensate for the capacitances of the circuit, thereby to extend the gain of the circuit in frequency and increase the speed of operation of the circuit in a manner well-known in the art. The plate of tube 10 is cross connected to the grid of tube 11 through the parallel combination of resistor 16 and condenser 17, and the plate of tube 11 is similarly cross connected to the grid of tube 10 through the parallel combination of resistor 18 and condenser 19. The grids of tubes 10 and 11 are also respectively connected through resistors 20 and 21 to a source of negative voltage, resistor 21 being directly connected, and resistor 20 being connected through resistor 22 (with reset switch 23 open) to the −150 volt line. The addition of resistor 22 insures that when reset switch 23 is opened, all trigger stages return to the condition shown in the drawing, namely, with the shaded tubes conducting. The grids of tubes 10 and 11 are connected through clamping diodes 24 and 25 to a source of biasing voltage, which in the present circuit, has a value of −9 volts. Diodes 24 and 25 and the bias voltage function to prevent the grids from going so far negative during a switching operation that too much time is consumed in returning to a condition where they can again be switched. They have the effect of quickly charging condensers 19 and 17 and therefore increasing the speed of operation of the multivibrator. Diodes 24 and 25 are preferably of the germanium crystal type, but it is to be understood that any suitable type rectifier, such as diode type vacuum tubes may be used.

Each of remaining trigger stages II, III, IV, and T are essentially the same as the stage just described, and for purposes of describing the overall operation of the counter, it will suffice to identify only the tubes of these stages. Thus, stage II includes tubes 30 and 31; stage III includes tubes 40 and 41; stage IV includes tubes 50 and 51; and auxiliary trigger stage T includes tubes 60 and 61.

An input terminal 26 is connected through coupling capacitor 27 to the grids of both of tubes 10 and 11 through germanium diodes 28 and 29, respectively. A source of negative pulses to be counted is connected to input terminal 26, which pulses have characteristics suitable to effect a change in the stable condition of counter stage I. Diodes 28 and 29 are connected to pass only negative pulses, and accordingly, positive pulses appearing at input terminal 26 will not effect a change in the stable condition of any of the trigger stages.

When a negative pulse is applied to terminal 26, it is coupled to the grids of both of tubes 10 and 11 through diodes 28 and 29. Tube 11 being nonconducting, the negative pulse has no effect, but the decrease in potential at the grid of tube 10 causes tube 10 to cease conducting, thereby causing an increase in potential at the plate thereof and at the grid of tube 11 to cause the latter to start conducting. This results in a positive pulse being generated at point 9 by the differentiating action of condenser 33 and resistor 34, but because it is positive, has no effect on stage II. Simultaneously with tube 10 becoming nonconducting, tube 11 becomes conducting resulting in a decrease in potential at the plate of tube 11. This voltage change is coupled via connection 62 to trigger stage T, and through the differentiating action of condenser 63 and resistor 64 produces a negative pulse at the grid of tube 60. Tube 60, being in the nonconducting state, however, the negative pulse has no effect. The significance of connection 62 will become apparent, however, as the description proceeds.

Returning now to the operation of stage I, when a second negative pulse is applied to input terminal 26, tube 10 is found in the nonconducting state and tube 11 in the conducting state. The second pulse therefore cuts off tube 11 which in turn drives tube 10 back to its conducting state. The second pulse therefore changes the stage from the "odd" to the "even" state, and in so doing causes a decrease in potential at the plate of tube 10 and, accordingly, the transfer of a negative pulse to the grids of tubes 30 and 31 of stage II. The increase in potential resulting at the plate of tube 11 during this transmission likewise cannot effect a change of condition of auxiliary stage T because of diode 65.

The transfer of a pulse from stage I to stage II upon the application of the second input pulse causes stage II to be switched from its "even" to its "odd" state, and following the foregoing reasoning, is not switched back to its "even" stage until the application to input terminal 26 of a fourth input pulse. As stage II goes from its "odd" to its "even" stage, a transfer pulse is fed to stage III causing the latter to switch from the "even" to the "odd" condition, and so on, until upon the application of the eighth input pulse stage IV is triggered from its "even" to its "odd" state. That is, tube 50 is rendered nonconducting and tube 51 conducting, resulting in a decrease in potential at the plate of tube 51. This voltage change is transferred via lead 52 to the differentiating circuit consisting of condenser 53 and resistor 54, resulting in the application of a negative pulse to the grid of tube 61. Tube 61 being conducting at the time of arrival, this negative pulse cuts off tube 61 and turns tube 60 on, thus changing the condition of stage T from its "even" to its "odd" state. At this point then, following the application of eight input pulses, stages I, II, and III are in the "even" state and stage IV and T are in the "odd" state (see Chart of Fig. 4).

As the ninth pulse is applied to input terminal 26, stage I is switched from the "even" to the "odd" condition, in the manner previously described, with a resulting decrease in potential at the plate of tube 11 and an increase in potential at the plate of tube 10. The potential change at plate 11 is transferred via lead 62, is differentiated by condenser 63 and resistor 64 to produce a negative pulse, which, finding tube 60 in the conducting condition (stage T in the "odd" state), switches tube 60 off and turns tube 61 back on. During this transition, there is a decrease in potential at the plate of tube 61, which after differentiation by condenser 66 and resistor 67, results in a negative pulse being transferred via lead 68 and germanium diodes 32 and 42 to the control grids of tubes 30 and 40 of stages II and III. At this instant, as was previously noted, stage II and III are both in the "even" state, and the application of a negative pulse to the grid of the conducting tubes causes both stages to be switched from the "even" to the "odd" state. Therefore, through the interaction of stage I and auxiliary trigger stage T, upon the application of the ninth pulse, stages I, II and III are all switched from the "even" to the "odd" state, and stage T is switched to the "even" state, and since there are no transfer pulses produced by any of the stages during the transition from "even" to "odd," stage IV is not affected by the application of the ninth pulse and remains in its "odd" state. Upon the application of the tenth pulse, stage I is switched from "odd" to "even" producing a transfer pulse which switches stage II from "odd" to "even," which in turn produces a transfer pulse which switches stage III from "odd" to "even," and finally, stage III produces a transfer pulse which switches stage IV from "odd" to "even." Auxiliary stage T being in the "even" state upon the arrival of the tenth pulse is unaffected by the transition in stability of stages I and IV, and thus remains in the "even" state. As stage IV goes from the "odd" state back to the "even" state, the potential at the plate of tube 50 is decreased, and this change is coupled to an external circuit through condenser 55 and output terminal 56. It is thus seen that the circuit just described produces a single output signal upon the application of ten input pulses to terminal 26.

The action of the counter circuit does not end when the cycle of counter operation ends, but because the counter is in the same condition after ten counts as it is for zero count (Fig. 4), the first pulse of the next cycle of ten pulses starts a new cycle of operation exactly like the one just described. It is seen that the auxiliary circuit T becomes effective in response to the eighth pulse to be counted in each group of ten, and is returned to its ineffective position on the ninth pulse. The auxiliary circuit T is therefore always ready to produce the additional pulse for application to stages II and III and assures uniform counter operation in response to each ten pulses, regardless of the rate of counting.

It is emphasized that auxiliary trigger stage T, in response to a pulse from stage I during the transition thereof from the "even" to the "odd" state, produces feedback pulses for simultaneously switching stages II and III from the "even" to the "odd" state. This being so, there are no forwardly moving transfer pulses being generated or coupled in either of stages I, II, III, or IV at the instant that the feedback pulses are being applied to stages II and III. In other words, the feedback pulses are inserted into the scale at a different time in the cycle of operation than the forward processsion of information. Hence, there is no problem of keeping the feedback and transfer pulses apart, and phasing and pulse amplitude problems disappear. Furthermore, no stage must, at any point in the counting cycle, either switch twice or perform a function in one state and then immediately switch to the other state of stability. Therefore, the present scale-of-ten circuit is equally as fast as the scale-of-sixteen binary scaler which has been modified to accomplish decade counting. That is, the feedback pulses are arranged to come at such a time in the counting cycle that they do not reduce the speed of counting of which an unmodified series chain of binary elements is otherwise capable.

By arranging the timing of the feedback pulses in this way, clamping the grids of the tubes of each stage to limit grid swing, and inserting inductances in the plate circuit of each of the tubes of the circuit, a counter is provided which will operate with a stability and accuracy at a much higher speed than the counters of the prior art. Using the components described herein, none of which were of precision tolerance, the circuit operated reliably at a speed of 3 megacycles per second, it being understood that the speed is limited by the resolving time of the individual binary stages, and not by the insertion of feedback pulses.

While a preferred embodiment of the invention has been described in connection with Fig. 3, the circuit as illustrated therein may be modified slightly to provide a decade counter having a somewhat different sequence of operation than that of the circuit of Fig. 3. Employing the symbolism explained earlier, the sequence of operation of the circuit of Fig. 3 is depicted as follows: $4_{01}\rightarrow T_{01}$, $1_{01}\rightarrow T_{10}$, $T_{10}\rightarrow 2_{01}$, $3_{01}$. By removing connection 52 between the plate of tube 51 and condenser 53 and substituting therefor a connection between the plate of tube 50 and condenser 53, as indicated by the dotted connection 57, and reversing the initial condition of stability of trigger circuit T by connecting the grid of tube 61 to the −150 volt line and the grid of tube 60 through resistor 22 to the −150 volt line, the circuit can be made to have the following sequence of operation:

$$4_{10}\rightarrow T_{01},\ 1_{01}\rightarrow T_{10},\ T_{10}\rightarrow 2_{01},\ 3_{01}$$

The detailed operation of the circuit with this modification is outlined in the table of Fig. 5, and will now be briefly described.

In the initial or starting condition, the shaded tubes of stages I, II, III and IV, namely, 10, 30, 40, and 50 are conducting, and tube 60 of trigger stage T is conducting. That is, initially stages I, II, III, and IV are in the "even" condition of stability and trigger stage T is in the "odd" condition of stability. Upon the arrival of the first input pulse, tube 10 is cut off and tube 11 turned on resulting in a decrease in potential at the plate of tube 11. This change in potential is differentiated by condenser 63 and resistor 64, resulting in a negative pulse at the grid of tube 60. Tube 60, being conducting at the time, is cut off, resulting in stage T being switched from the "odd" to the "even" condition of stability and a decrease in potential at the plate of tube 61. This decrease in potential is differentiated by condenser 66 and resistor 67 to produce a negative pulse, which in turn, is coupled via diodes 32 and 42 to the control grids of tubes 30 and 40, respectively. Tubes 30 and 40, then being in the conducting state, are cut off thus switching stages II and III from the "even" to the "odd" condition of stability. After the arrival of the first input pulse, then, stages I, II and III are in the "odd" state and stage IV and trigger stage T are in the "even" state of stability. Thereafter, counting proceeds normally in the binary system, as shown by the table of Fig. 5, until the arrival of the tenth input pulse when stage IV, in going from its "odd" to its "even" condition of stability, produces a decrease in potential at the plate of tube 50, which after differentiation, turns tube 61 off to return it to its "odd" condition of stability. The circuit therefore functions to produce one output signal upon the application of ten input counts, and although operating on a sequence somewhat different from that previously described in connection with Fig. 3, the advantages of the invention are still present. That is, the injection of feedback pulses to stages II and III occurs at a time in the counting cycle when no transfer pulses are being forwardly processed to or by stages II and III.

While the invention has been described as embodied in a counter wherein the bistable element is a multivibrator, it is to be understood that the invention is equally applicable to other counters using other bistable devices as the binary element, be it electronic, electrical or mechanical. For example, multi-electrode tubes may be used in the multivibrators, or relays may be used to indicate "off" and "on" conditions of a trigger stage without departing from the spirit of the invention, namely, the insertion of feedback information at a time in the counting cycle when it does not interfere with the forward procession of information.

Figure 6:
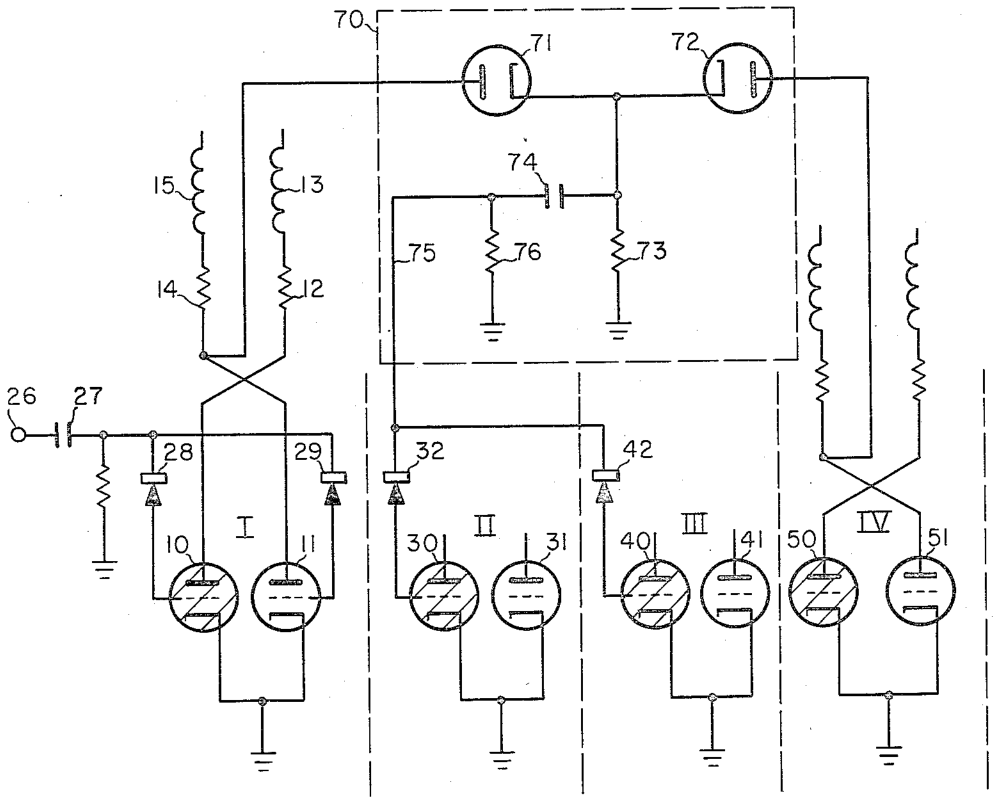
Fig. 6 is a schematic diagram, illustrating a second embodiment of the present invention.

Similarly, trigger stage T need not be a bistable stage of the type described to be within the spirit of the invention. Stage T may alternatively be a gating circuit which is responsive to changes in stability of two binary elements of the series chain to produce a pulse for application to stages II and III of the chain at a time when there are no transfer pulses being forwardly processed to or by stages II and III. Fig. 6 illustrates a suitable form of gating circuit connected to a series chain of four binary stages, the gating circuit being represented by dotted line enclosure 70. The series chain of binary elements has been illustrated in fragmentary fashion to include only those parts of the chain which affect the operation of the auxiliary switching circuit, the pertinent components of the trigger circuits being identified with reference numerals corresponding to those used in Fig. 3. For example, stage I includes tubes 10 and 11, and diodes 28 and 29 through which negative input pulses are coupled to the grids of the tubes from input terminal 26. Stage II includes tubes 30 and 31, stage III includes tubes 40 and 41, and stage IV includes tubes 50 and 51. It is understood, of course, that the stages are interconnected in the manner illustrated in Fig. 3, but these connections have been omitted for purposes of clarity.

Auxiliary switching circuit 70 includes a pair of diodes 71 and 72, respectively connected to the plate of tube 11 of stage I and to the plate of tube 51 of stage IV. The cathodes of the two diodes are connected together and resistor 73 forms a return path to ground. The cathodes of diodes 71 and 72 are also connected through condenser 74 via connection 75 to diodes 32 and 42, and thence to the grids of tubes 30 and 40.

Circuit 70 depends for its operation on the changes in potential at the plates of tubes 11 and 51 as they are switched from one condition of stability to the other, and as will be seen, produces an output signal for application to stages II and III, only when tubes 11 and 51 are both in the conducting state. When a negative pulse is applied to terminal 26 and coupled to the grids of tubes 10 and 11, tube 10 is turned off and tube 11 is turned on resulting in a decrease in potential at the plate of tube 11 and at the anode of diode 71. Tube 51 being nonconducting at this instant, however, the potential at the plate of tube 51 is up causing conduction of diode 72 with the result that the cathodes of tubes 71 and 72 are at the same potential as the plate of tube 51. Thus, the decrease in potential of plate 11 has no effect on diode 71. Likewise, as tube 11 goes back to the nonconducting state upon the application of the second pulse to input terminal 26, the increase in potential on its plate has no effect on the potential at the cathodes of diodes 71 and 72. Counting continues in the series chain in the usual fashion, until the eighth count, when tube 51 is switched from nonconducting to conducting resulting in a decrease in potential at its plate. At this instant, however, tube 11 of stage I is nonconducting so that again circuit 70 is unaffected. Upon receipt of the ninth pulse, however, with the potential at the plate of tube 51 being down, and the change in the condition of stability of stage I causing the potential at the plate of tube 11 to also go down, the voltage is suddenly decreased at the cathodes of diodes 71 and 72. The voltage change is differentiated by condenser 74 and resistor 76 resulting in a negative pulse being coupled through diodes 32 and 42 to the grid of tubes 30 and 40. Tubes 30 and 40, which are both conducting at this instant of the counting cycle, are turned off, thereby switching stages II and III from the "even" to the "odd" state. Upon arrival of the tenth input pulse, stages I, II, III, and IV are each switched from the "odd" to the "even" condition of stability, and circuit 70 is rendered inoperative until the arrival of the ninth pulse of the next group of ten input pulses.

While circuit 70 has been described as a gating circuit employing two diodes, it will be readily appreciated that other gating circuits using multi-grid electron tubes and responsive to changes in stability of stages I and IV to produce an output pulse to switch stages II and III from the "even" to the "odd" condition, may be used without departing from the spirit of the invention.

Furthermore, the invention is not limited to the described arrangement of bistable circuits for producing a scale-of-ten, but also includes other schemes, particularly those producing counts differing from ten, for example 60 or 100, so long as the feedback occurs at a time different from the forward transmission of information.

In addition to the foregoing possible modifications, other substitutions and changes in form and detail of the described circuit may be made by those skilled in the art without departing from the spirit of the invention. It is the intention therefore to be limited only as indicated by the scope of the following claims.

What is claimed is:

1. A counter circuit including a chain of four bistable elements each having alternately assumed first and second conditions of stability in response to pulses to be counted, an auxiliary circuit interconnected between the first and fourth bistable elements of said chain and operative to produce an output pulse only when said first and fourth bistable elements are each in their second condition of stability, and means for coupling said output pulse only to the second and third binary elements of said chain to switch said second and third bistable elements from one condition of stability to the other at a time in the counting cycle when no transfer information is processing forwardly to or by said second and third bistable elements.

2. A counter circuit including a series chain of four binary type elements each having alternately assumed first and second conditions of stability in response to pulses to be counted, each of said binary elements being arranged to couple a negative transfer signal to the next succeeding binary element only upon being switched from its second to its first condition of stability, and an auxiliary switching circuit connected to the first and fourth binary elements of said chain and operative to produce a negative output pulse only when said first and fourth binary elements are each in their second condition of stability, and means for substantially instantaneously coupling said negative output pulse from said auxiliary switching circuit only to the second and third binary elements of said chain to switch said second and third binary elements from the first to the second condition of stability at a time in the counting cycle when no transfer signals are being forwardly processed to and by said second and third binary elements.

3. A counter circuit including a series chain of four binary type trigger elements each having alternately assumed first and second conditions of stability in response to pulses to be counted, means for resetting said trigger elements to a predetermined starting condition, an auxiliary binary type trigger element having alternately assumed first and second conditions of stability in response to pulses derived only from the first and fourth trigger elements of said series chain and operative to produce a negative output pulse only when said first and fourth trigger elements are simultaneously in their second condition of stability, and means connecting said auxiliary trigger element to the second and third trigger elements of said chain for coupling said negative pulse thereto to switch said second and third trigger elements from one condition of stability to another at a time when no information is being forwardly processed to or by said second and third trigger elements.

4. A decade counter circuit including a series chain of four binary type elements each having alternately assumed first and second conditions of stability in response to pulses to be counted, each of said binary elements being arranged to couple a transfer signal to the next succeeding binary element only upon being switched from its first to its second condition of stability, an auxiliary binary type trigger element having alternately assumed first and second conditions of stability and arranged to produce a negative transfer pulse only upon being switched from its second to its first condition of stability, means responsive to the occurrence of an eighth pulse to be counted for coupling a pulse from the fourth binary element to said auxiliary circuit to switch said auxiliary circuit from its first to its second condition of stability, means responsive to the occurrence of a ninth pulse to be counted for coupling a pulse from the first binary element to said auxiliary circuit to switch said auxiliary circuit from its second to its first condition of stability thereby to produce a negative transfer pulse, and means coupling said negative transfer pulse from said auxiliary binary element to the second and third binary elements of said chain to switch said second and third binary elements from their then second to their first condition of stability.

5. A decade counter circuit including a chain of four bistable elements each having alternately assumed first and second conditions of stability in response to pulses to be counted, a gating circuit interconnected between the first and fourth bistable elements of said chain, said gating circuit being responsive to said first and fourth bistable elements being simultaneously in said second condition of stability to produce an output pulse, and means for coupling said output pulse only to the second and third binary elements of said chain to switch said second and third bistable elements from the first to the second condition of stability at a time in the counting cycle when no transfer information is processing forwardly to or by said second and third bistable elements.

6. A decade counter circuit including a chain of four binary type trigger elements each having alternately assumed first and second conditions of stability in response to pulses to be counted, a gating circuit including a pair of diodes having their cathodes connected together and having their anodes respectively connected to the first and fourth trigger elements of said chain, said gating circuit being responsive to said first and fourth trigger elements being simultaneously in said second condition of stability to produce an output signal, and means connecting said gating circuit to the second and third trigger elements of said chain for coupling said output signal thereto to switch said second and third trigger elements from the first to the second condition of stability at a time in the counting cycle when no transfer information is processing forwardly to or by said second and third trigger elements.

7. An electronic counter including four trigger circuits each having first and second stable conditions alternately assumed in response to pulses applied thereto, said trigger circuits being connected in a series chain for binary operation, a source of pulses to be counted connected to the first trigger circuit of said chain, and an additional trigger circuit connected to the first and fourth trigger circuits of said chain and operative to produce an output pulse only upon said fourth trigger circuit being in its second stable condition and said first trigger circuit being switched from its first to its second stable condition, and connections between said additional trigger circuit and said second and third trigger circuits for coupling said output pulse to the second and third trigger circuits to cause decade operation of said chain.

8. A decade counter circuit including four trigger circuit stages connected in cascade, each of said stages having alternately assumed first and second conditions of stability in response to pulses applied thereto and arranged to produce a negative transfer pulse to the next succeeding stage only upon being switched from its second to its first condition of stability, means coupled to the first of said stages for coupling input pulses thereto, each of said input pulses being effective to switch said first stage, an auxiliary trigger circuit stage having first and second conditions of stability, means for deriving a pulse from the fourth stage in response to the occurrence of an eighth input pulse to switch said auxiliary stage from its first to its second condition of stability, means for deriving a pulse from said first stage in response to the occurrence of a ninth input pulse to switch said auxiliary stage from its second to its first condition of stability, a coupling from said auxiliary stage to the second and third stages for switching the second and third stages in response to said auxiliary circuit being switched to its said first condition of stability, and an output circuit coupled to said fourth stage.

9. A decade counter circuit comprising, in combination, four trigger circuit stages each including a pair of electron tubes having a respective anode, cathode, and grid, the grids and anodes of each pair of said tubes being cross-connected, means connecting said stages in cascade to provide operation of each of said stages except the first in response to two operations of the next preceding stage, means coupled to the first of said stages for applying input pulses thereto, an auxiliary trigger circuit stage including first and second electron tubes having a respective anode, cathode, and grid with the grids and anodes cross-connected, said auxiliary stage being normally in a first condition of operation with said first and second tubes conducting and non-conducting, respectively, means for coupling a negative pulse from the first stage to the grid of said second normally non-conducting tube in response to alternate odd input pulses, means for coupling a negative pulse from the fourth stage to the grid of said first normally conducting tube in response to the occurrence of an eighth input pulse to cause switching of said auxiliary stage to a second condition of operation with said first and second tubes non-conducting and conducting, respectively, whereby upon occurrence of a ninth input pulse a negative pulse derived from said first stage and applied to the grid of said second tube switches said auxiliary stage to its first condition of operation, and means for coupling a negative pulse from said auxiliary stage to the grids of corresponding tubes of the second and third stages in response to said auxiliary stage being switched from its second to its first condition of operation to cause operation of said second and third stages at a time in the counting cycle when there is no forward transfer of pulses in said second and third stages.

10. A decade counter circuit comprising, in combination, four trigger circuit stages each including a pair of electron tubes having a respective anode, cathode, and grid, the grids and anodes of each pair of said tubes being cross-connected, means connecting said stages in cascade to provide operation of each of said stages except the first in response to two operations of the next preceding stage, means coupled to the first of said stages for applying input pulses thereto, an auxiliary trigger circuit stage including first and second electron tubes having a respective anode, cathode, and grid with the grids and anodes cross-connected, means connecting the anode of one of the tubes of the first stage to the grid of said first tube, means connecting the anode of one of the tubes of the fourth stage to the grid of said second tube, said auxiliary stage being operative in response to pulses coupled thereto from the first and fourth stages to produce an output pulse only upon said first and fourth stages being simultaneously in the same condition of operation, means for coupling said output pulse to the grids of corresponding tubes in the second and third stages to cause operation of said second and third stages at a time in the counting cycle when no transfer information is processing forwardly to or by said second and third stages.

11. A decade counter circuit comprising, in combination, four trigger circuit stages each including a pair of electron tubes having a respective anode, cathode, and grid, the grids and anodes of each pair of said tubes being cross-connected, means connecting said stages in cascade to provide operation of each of said stages except the first in response to two operations of the next preceding stage, means coupled to the first of said stages for applying input pulses thereto, a gating circuit including first and second diodes having their cathodes connected together, means connecting the anode of said first diode to the anode of one of the tubes of the first stage, means connecting the anode of said second diode to the anode of one of the tubes of the fourth stage, said gating circuit being responsive to the tubes in said first and fourth stages to which said diodes are connected being simultaneously non-conducting to produce an output signal, and means connecting said gating circuit to the grids of corresponding tubes in the second and third stages for coupling said output signal thereto to cause operation of said second and third stages at a time in the counting cycle when no transfer information is processing forwardly to or by said second and third stages.

References Cited in the file of this patent

UNITED STATES PATENTS

| | | |
|---|---|---|
| 2,521,788 | Grosdoff | Sept. 12, 1950 |
| 2,540,442 | Grosdoff | Feb. 6, 1951 |
| 2,547,434 | Bergfors | Apr. 3, 1951 |
| 2,557,384 | Klein | June 19, 1951 |
| 2,566,918 | Bergfors | Sept. 4, 1951 |
| 2,594,742 | Dickinson | Apr. 29, 1952 |
| 2,690,303 | Nolde et al. | Sept. 28, 1954 |

OTHER REFERENCES

"Gated Decade Counter Requires No Feedback," by E. L. Kemp—Electronics, February 1953.

"Waveforms," vol. 19 of Radiation Laboratory Series, pages 604–609.